United States Patent
Nachenberg et al.

(10) Patent No.: US 9,940,470 B2
(45) Date of Patent: Apr. 10, 2018

(54) TECHNIQUES FOR GENERATING A VIRTUAL PRIVATE CONTAINER

(71) Applicant: Symantec Corporation, Mountain View, CA (US)

(72) Inventors: Carey S. Nachenberg, Manhattan Beach, CA (US); Paul Agbabian, Los Angeles, CA (US); William E. Sobel, Jamul, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 14/876,403

(22) Filed: Oct. 6, 2015

(65) Prior Publication Data
US 2017/0098092 A1 Apr. 6, 2017

(51) Int. Cl.
| | |
|---|---|
| H04L 29/06 | (2006.01) |
| G06F 21/62 | (2013.01) |
| H04L 29/08 | (2006.01) |
| G06F 21/31 | (2013.01) |
| G06F 21/60 | (2013.01) |
| G06F 9/455 | (2018.01) |

(52) U.S. Cl.
CPC .............. *G06F 21/62* (2013.01); *H04L 63/08* (2013.01); *H04L 63/10* (2013.01); *G06F 21/31* (2013.01); *G06F 21/60* (2013.01); *G06F 2009/45587* (2013.01); *G06F 2009/45595* (2013.01); *H04L 63/14* (2013.01); *H04L 63/1408* (2013.01); *H04L 67/1097* (2013.01)

(58) Field of Classification Search
CPC .................................. G06F 21/62; H04L 63/10
See application file for complete search history.

(56) References Cited

U.S. PATENT DOCUMENTS

| | | | | |
|---|---|---|---|---|
| 9,223,966 | B1 * | 12/2015 | Satish | G06F 21/53 |
| 9,256,467 | B1 * | 2/2016 | Singh | G06F 9/5055 |
| 9,378,035 | B2 * | 6/2016 | Kripalani | |
| 9,398,017 | B1 * | 7/2016 | Nizametdinov | H04L 63/10 |

(Continued)

FOREIGN PATENT DOCUMENTS

EP         2053509 A2 *   4/2009   .......... G06F 9/4856

OTHER PUBLICATIONS

International Search Report and Written Opinion issued by the European Patent Office as International Searching Authority for International Applicaiton No. PCT/US2016/053963 dated Dec. 8, 2016 (12 pages).

*Primary Examiner* — Shawnchoy Rahman
(74) *Attorney, Agent, or Firm* — Maschoff Brennan (57) ABSTRACT

Techniques for generating a virtual private container (VPC) are disclosed. In one embodiment, the techniques may be realized as a virtual container defining a self-contained software environment, comprising one or more analytic components configured to carry out specified analytic functions on data within the container, wherein the one or more analytic components are isolated to run within the self-contained software environment of the container; an interface configured to identify and authenticate a particular user and provide analysis results generated by the one or more analytic components; and a gateway configured to receive data from one or more secure data sources external to the virtual container and associated with the particular user for use by the one or more analytic components.

18 Claims, 5 Drawing Sheets

(56) References Cited

U.S. PATENT DOCUMENTS

| | | | |
|---|---|---|---|
| 9,613,190 B2* | 4/2017 | Ford | G06F 21/10 |
| 2003/0229794 A1* | 12/2003 | Sutton, II | G06F 12/1491 |
| | | | 713/189 |
| 2004/0205101 A1 | 10/2004 | Radhakrishnan | |
| 2011/0047597 A1 | 2/2011 | Mahaffey et al. | |
| 2012/0069131 A1* | 3/2012 | Abelow | G06Q 10/067 |
| | | | 348/14.01 |
| 2012/0198442 A1* | 8/2012 | Kashyap | G06F 8/61 |
| | | | 718/1 |
| 2013/0036213 A1 | 2/2013 | Hasan et al. | |
| 2013/0276068 A1* | 10/2013 | Alwar | G06F 21/53 |
| | | | 726/4 |
| 2015/0163206 A1* | 6/2015 | McCarthy | G06F 21/6227 |
| | | | 713/171 |
| 2016/0044012 A1* | 2/2016 | Carrer | H04L 41/0803 |
| | | | 726/6 |
| 2016/0088092 A1* | 3/2016 | Cardona-Gonzalez | H04L 67/141 |
| | | | 709/227 |
| 2016/0253731 A1* | 9/2016 | Ketchel, III | G06Q 30/0633 |
| | | | 705/26.5 |
| 2017/0026244 A1* | 1/2017 | Kamath | H04L 41/12 |

* cited by examiner

TECHNIQUES FOR GENERATING A VIRTUAL PRIVATE CONTAINER

FIELD OF THE DISCLOSURE

The present disclosure relates generally to data analytics and, more particularly, to techniques for generating a virtual private container.

BACKGROUND OF THE DISCLOSURE

As data repositories are increasingly moved off-site, with central services designed around multiple data sets, customers are increasingly concerned about the security of their data. Data leaks are not unheard of, and both unintentional and malicious access of customer data can occur if environments are not properly sanitized and secured.

These issues are further exacerbated with the existence of value-added analytics by third parties. A variety of security and authorization tangles can result when, for example, a customer wishes to avail themselves of particular third-party tools to analyze their secure data. Drawing and accessing data to hand to the third party, or even worse providing the third party the user's own authorization credentials to a data repository, can greatly increase risk of data leakage or corruption and provide more opportunities for problems than the analytics themselves may be worth.

For this reason, service providers devote significant man-hours to tailor data environments to client needs. Not only are these custom environments expensive because of the labor costs associated with creating them, but there is no particular guarantee that a user error in a custom environment won't result in an exploitable vulnerability—an access error resulting in a data leak.

In view of the foregoing, it may be understood that there may be significant problems and shortcomings associated with current techniques for customized access to data stored in offsite repositories.

SUMMARY OF THE DISCLOSURE

Techniques for generating a virtual private container are disclosed. In one embodiment, the techniques may be realized as a virtual container defining a self-contained software environment, comprising one or more analytic components configured to carry out specified analytic functions on data within the container, wherein the one or more analytic components are isolated to run within the self-contained software environment of the container; an interface configured to identify and authenticate a particular user and provide analysis results generated by the one or more analytic components; and a gateway configured to receive data from one or more secure data sources external to the virtual container and associated with the particular user for use by the one or more analytic components.

In accordance with other aspects of this embodiment, the virtual container can be configured to limit access to and from unauthorized systems.

In accordance with other aspects of this embodiment, the one or more analytic components can be virtual machines.

In accordance with other aspects of this embodiment, the interface can provide data to an application provided to the customer.

In accordance with other aspects of this embodiment, the virtual container can be generated from a virtual container template. The virtual container template can be generated based on specifications by a third party service provider providing data analytics to customers. The specifications for the template can include the one or more analytic components.

In accordance with further aspects of this embodiment, the container can be generated from the virtual container template based on a customer's decision to use data analytics from the third party service provider.

In accordance with another embodiment, the techniques may be realized as a computer-generated method comprising the steps of receiving a specification for a virtual container from a service provider, the specification including analytic components, data ingress parameters, and configuration information; and generating, based on the received specification, a virtual container comprising the analytic components, the virtual container configured to access data according to the data ingress parameters, the virtual container configured according to the specified configuration information. The virtual container can be configured to limit access to and from unauthorized systems.

In accordance with other aspects of this embodiment, the data ingress parameters may specify streaming data transmission, or may specify batch data transmission.

In accordance with other aspects of this embodiment, the method may further comprise the steps of authenticating a first customer for services associated with the service provider; in response to authenticating the first customer, authorizing the virtual container to access secure data associated with the first customer; authenticating a second customer for services associated with the service provider; and, in response to authenticating the second customer, authorizing the virtual container to access secure data associated with the second customer; such that the virtual container has access to data associated with both customers.

In accordance with other aspects of this embodiment, the analytic components can be virtual machines.

In accordance with other aspects of this embodiment, the configuration information can include network configuration between the analytic components.

In accordance with other aspects of this embodiment, the specification can further specify resources and the generated virtual container includes the specified resources.

In accordance with further aspects of this embodiment, the specification can include a repository internal to the virtual container for storing data.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Embodiments of the present disclosure describe an automated service for providing secure, customized access to sensitive telemetric data. For a service provider that wishes to provide analytics based on customer data, the provider can submit a specification to the data aggregator for a virtual private container (VPC) meeting all of the necessary requirements for the service's data analytics. Subsequently, a data contributor who wishes to use the service can provide authorization to the data aggregator, resulting in a VPC with the requested specifications having secure access to the user's data. For each participating customer, the data enters the VPC, which in turn communicates results to the customer. The VPC includes restrictions on data egress so that the VPC cannot be improperly used as a means for bypassing data access restrictions and copying or re-transmitting the data.

The system receives a specification for an application which includes a complete list of environment requirements, including a software-defined network layout, a list of virtual machine (VM) images that make up the app, VM memory and CPU specifications for each required VM, storage requirements (direct or object storage), a detailed list of the specific telemetric schema types (e.g., FW schema, AV schema) to which the app needs access along with whether the app needs streaming and/or batch access to this data. The system generates virtual private container instances which are tailored to the stated requirements with very explicit rules for data ingress and egress—requested data must match pre-established criteria to be imported into a VPC and mass data export is prohibited altogether. Only a specific set of pre-defined interfaces will be exposed from the VPC enabling properly authenticated users and/or services to retrieve analytic results in a secure manner. Data can be freely manipulated within the confines of the VPC but there is no mechanism to move data between VPCs or to re-upload results from the VPC to the larger system. The analytic capabilities of each client are therefore maximized while threats to security are minimized.

Figure 1:
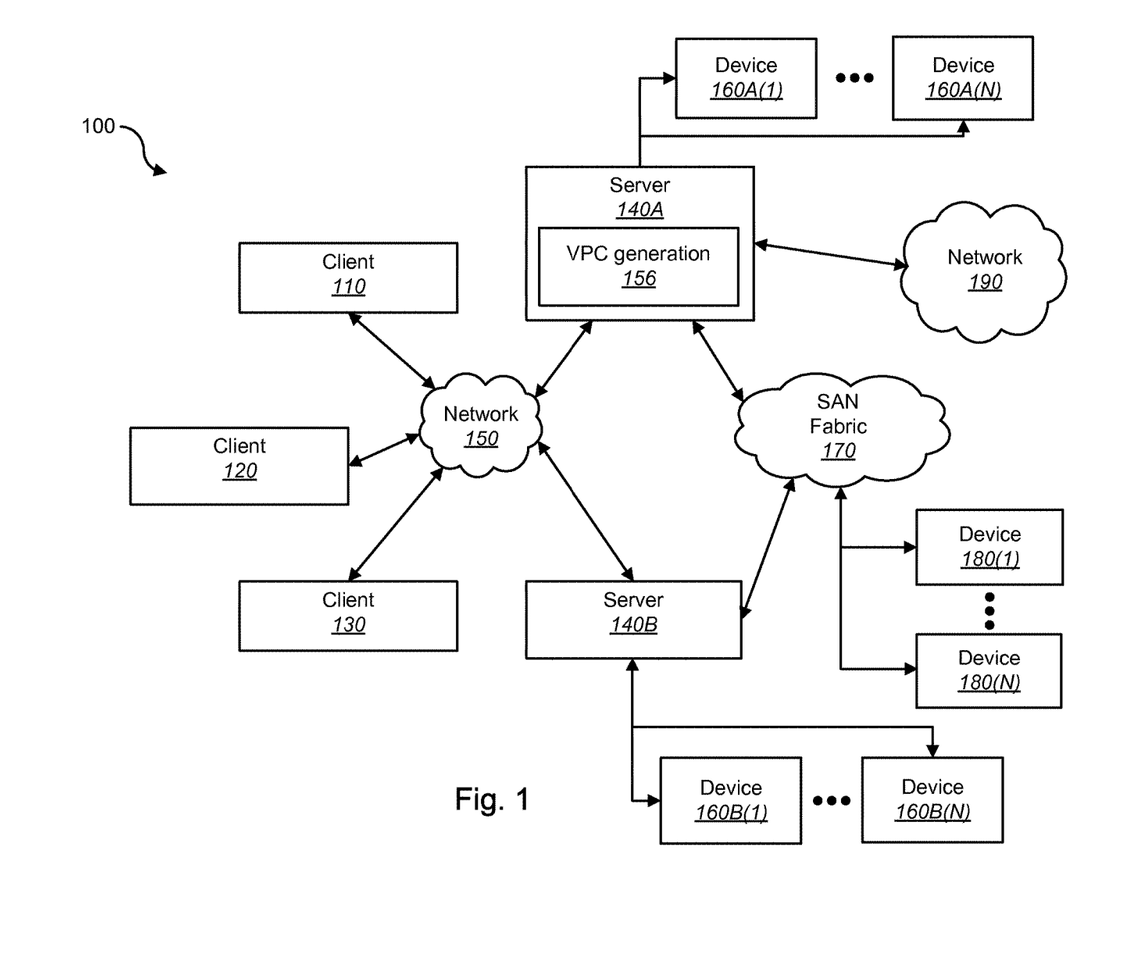
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
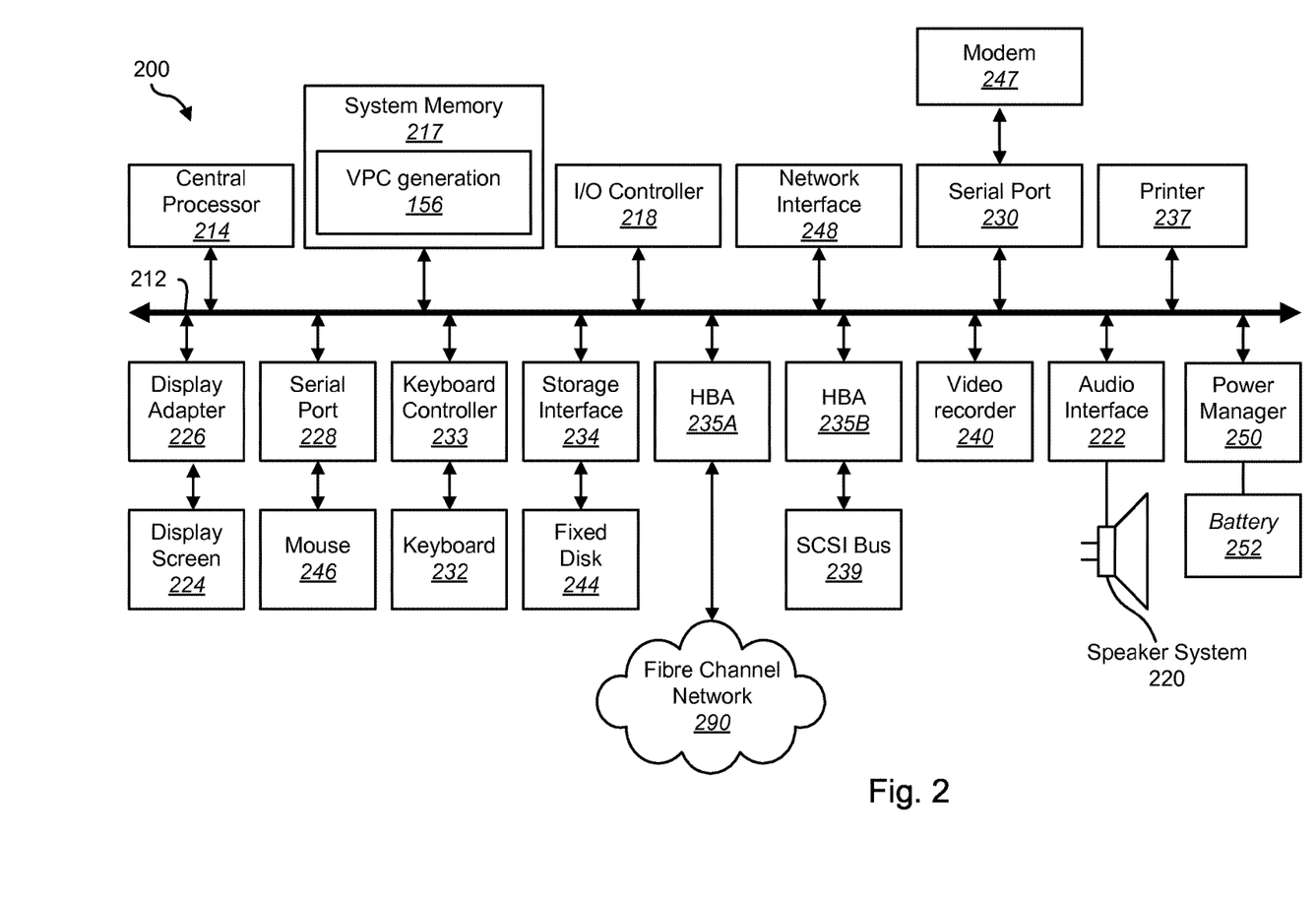
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180 (1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, a VPC generation module 156 can reside at a network centric location such as server 140A. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including the VPC generation module 156 and virtual private containers generated thereby may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a printer 237 operative to receive data and/or images for printing, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a printer 237, a removable disk unit (e.g., Universal Serial Bus drive), or other storage medium. According to some embodiments, a VPC generation module 156 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244 or optical disk 242. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
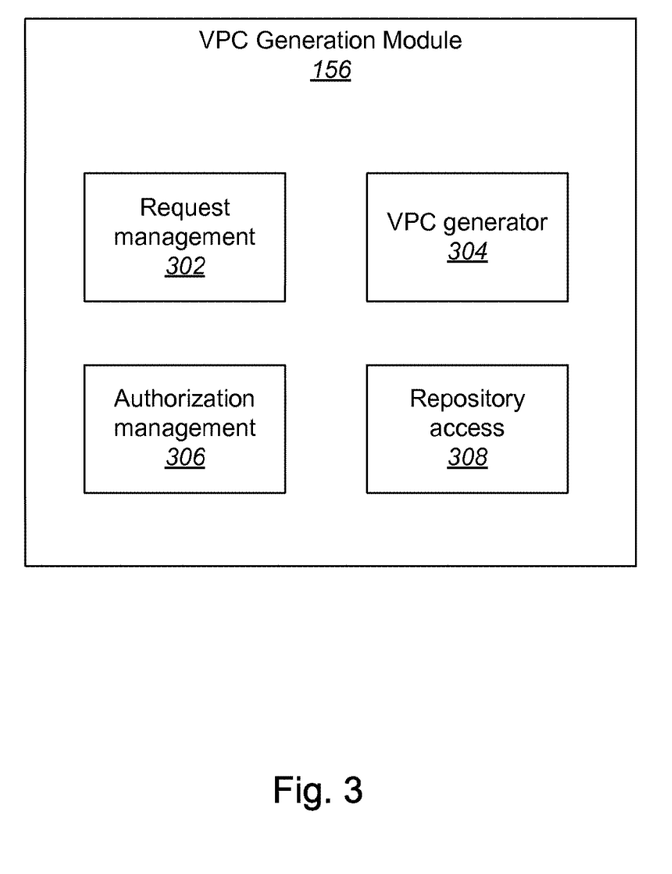
FIG. 3 shows a block diagram illustrating a virtual private container (VPC) generation module in accordance with an embodiment of the present disclosure.

FIG. 3 illustrates an example of the VPC generation module 156 configured to automatically administrate the generation of VPCs in accordance with specified requirements. The VPC generation module 156 can include both user and automated request management modules 302 which receives specifications and instantiation requests (of those specifications) from users or other computer systems regarding the disposition of various VPCs. The VPC generation module 156 may receive requests for the generation of new VPCs but may also receive requests to modify and delete VPCs as necessary. VPC requests may come from users through manual communication, by automated processes interconnected with the generation module 156, and as automated requests made by means of API or other standardized functions.

In some implementations, a specification for a VPC may include at least a software-defined network layout, a list of virtual machine images that make up the app, VM memory and CPU specifications for each required VM, storage requirements (direct or object storage), a detailed list of the specific telemetric schema types (e.g., FW schema, AV schema) to which the app needs access along with whether the app needs streaming or batch access to this data.

In some implementations, it may be expected that VPC specifications may primarily come from service providers interested in selling their services to customers. Upon receiving a VPC specification from a service provider, the request management module 302 will generate and run instances of the specified module as requested in accordance with the provider's specifications and the data management system's policies.

A VPC generation module 304 provisions the network connectivity, virtual machines, and storage specified by a request to instantiate and spin up a new VPC. Each VPC instance may only be allowed if it is associated with an approved specification.

Before a VPC is granted access to any data (or for that matter provisioned on behalf of a customer), a customer must first subscribe to the third-party service associated with the VPC and agree to grant the third-party service access to one or more classes of data held by the data aggregator. An authorization management module 306 operated by the data aggregator will require the customer to subscribe to the third-party service. Once subscription is complete, this will then result in (possible) instantiation of a new VPC instance provided by the third-party service provider, and provisioning access of the new/existing VPC to the subscribing customer's data. The VPC will then have streaming and/or batch access to the specific categories of data to which the customer has granted access.

In some implementations, each successful authorization by a new customer may result in a new VPC instance being generated. The new instance may have access only to the data associated with the authorizing customer. In some implementations, a successful authorization by a new customer will result in an existing VPC instance being granted additional data access privileges, enabling a single VPC instance to serve the new customer in addition to any previous customers being served by the instance.

The VPC may provide the results of its analytics via its own user interface (e.g., via HTML), or via programmatic web services or another communications mechanisms to an external application which renders the analytic results of the VPC. An example might be a Java Swing application which communications with the VPC over REST web services to obtain analytic data to display via an HTML front-end.

When a VPC instance is generated, the client of the VPC generation module 156 must provide an identity for the VPC. The VPC must then provide this identity along with all subsequent requests to obtain data from external systems (e.g., HDFS stores). These external systems will then check this identity against a permission list to determine what data (if any) the VPC is permitted access to, and therefore what data should be provided to the VPC. In a similar fashion, each time a new VPC is instantiated, should it have indicated the need for access to streaming telemetry, the identity of the VPC will be registered with the streaming subsystem to ensure that permissible telemetry is made available to the VPC system in a streaming fashion.

A repository access module 308 may configure the access control policy for all relevant repositories that hold data that may be needed by a given VPC. This configuration will specify the specific classes of data that may be retrieved by the VPC (e.g., Firewall data, Antivirus data) as well as from which customers (e.g., Ford) and administrative domains (e.g., USA-EAST, USA-WEST, EMEA, APAC) the VPC should be granted access to. So for example, the repository access module 308 may contact a repository and instruct it to grant a given VPC (with a given pre-provisioned identity) access to Ford's Firewall and AntiVirus telemetry from its USA-EAST and EMEA offices. If and when that VPC makes a request to the repository, it will be able to retrieve this specific subset of data (Firewall and Antivirus data) from this specific customer (Ford), from these specific regions (USA-EAST coast, EMEA). All other data (from other customers, other administrative domains, or of other telemetry classes) will be unavailable to the VPC.

Figure 4:
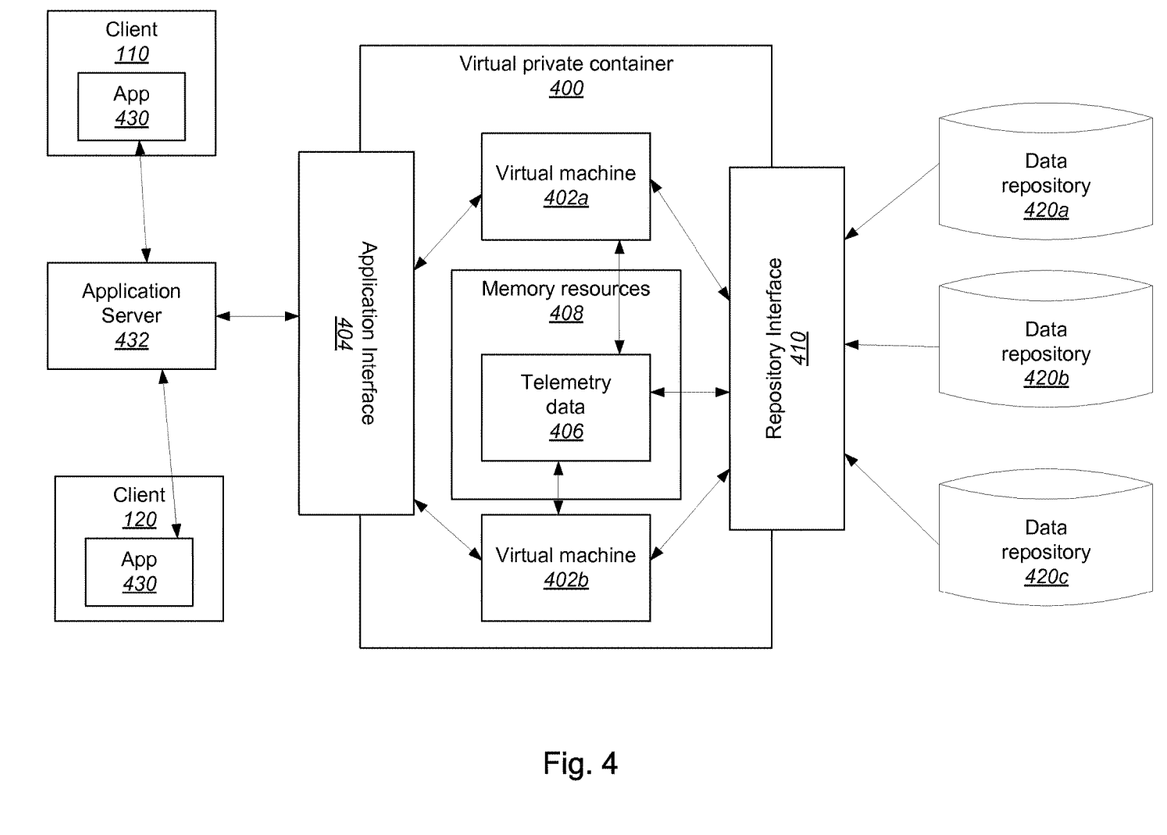
FIG. 4 shows a block diagram depicting a VPC in accordance with an embodiment of the present disclosure.

FIG. 4 illustrates an exemplary virtual private container 400 generated according to embodiments of the present disclosure. The VPC 400 includes a plurality of virtual machines 402a,b, each of which is generated in accordance with the received VPC request specification. Data is manipulated and results displayed by instructions from a customer interface 404, which can control access to the VPC from any client device 110, 120 that connects to the VPC. As shown, clients 110,120 may connect to the VPC by means of client applications communicating with an application server, which may in turn communicate with the VPC.

In some implementations, only output consistent with the results of analysis calculations of the virtual machines 402 may be provided as output to the customer though the interface 404. Similarly, only well-defined user input submitted through the user interface 404 may be passed on as instructions to the machines 402a,b. In some implementations, the customer interface 404 may not permit the upload or download of data to or from the VPC 400.

The virtual machines 402a,b can analyze and manipulate telemetry data 406 stored in the memory resources 408 allocated to the container 400, and then display the results of the analysis to customers 110,120,130 through the customer interface 404. Data required for these analyses can be accessed through the repository interface 410. In some implementations, there may be no internal storage; the VPC may receive streaming data from repositories and may maintain that data only long enough to provide analysis at the user's request—analytics provided "on demand."

In some implementations of the present disclosure, the repository interface 410 may restrict access to the data repositories 420a-c to only that data which is explicitly allowed to be imported into the VPC 400. The arrows between the repository interface and the various data repositories 420a-c are shown as one-way because, in some implementations, the VPC has no mechanism to upload data to the repositories 420a-c or modify data stored therein. Data generally flows into, not out of, the VPC 400; although results may be displayed via the customer interface 404, large data downloads out of the VPC 400 are generally not permitted.

Figure 5:
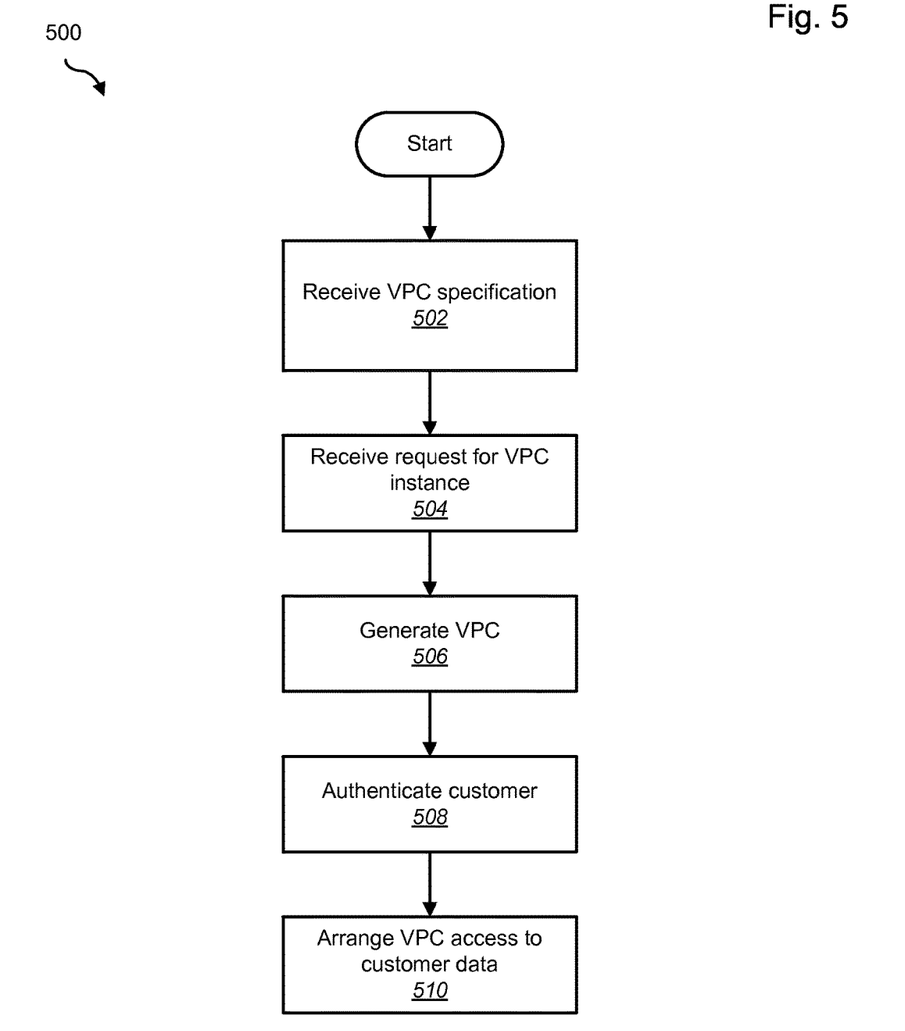
FIG. 5 shows a method for VPC generation in accordance with an embodiment of the present disclosure.

FIG. 5 illustrates a method 500 for automatically generating and managing VPCs in accordance with some embodiments of the disclosure. It will be understood that a variety of methods are possible within the scope of what has been described, and the following method 500 is given for illustrative purposes only. The steps described may be performed by any appropriate remote or cloud-based system such as a VPC generation module 156 as described above.

A VPC specification, (that is request to define a VPC template) is received (502). In some implementations, a VPC specification may include at least a software-defined network layout, a list of VM images that make up the application, VM memory and CPU specifications for each required VM, storage requirements (direct or object storage), and a detailed list of the specific telemetric schema types to which the virtual machines need access along with whether streaming or batch access is needed for each.

Once a VPC specification is accessed, subsequently, a request for a particular instance of the VPC is received and can be processed (504). The instance may, for example, be received on behalf of a customer that has chosen to use a third party service associated with the VPC specification. The instance request might not come directly from the customer; in some implementations, it may come through an automated system controlled by the third party, or by means of an application server that in turn manages an application provided to the customer.

More generally, the VPC may be configured such that bulk data export is not possible—the data is accessible only within the structure of the container itself. If analysis needs to be performed outside of the parameters allowed by the existing virtual machines, then appropriate modifications to the VPC (or the construction of a new VPC with different parameters) may be requested from the system, but the constraints of the container themselves are intentional and not to be arbitrarily bypassed. The system generates virtual machines subject to the expressed security constraints—that is, not including the ability to leak data or carry out arbitrary save/write functions outside the container itself. Other constraints, such as constraints on resources, may also be applied to limit the generation of virtual machines.

In addition to generating a VPC instance (506), the system may also authenticate the customer (508) and arrange corresponding access to the customer's data to the VPC (510). Which data is made available and under what conditions may depend on the VPC specification as well as on constraints established by particular customers.

It will be understood that in some embodiments, a new VPC instance is not requested or needed for each individual customer. Instead, multiple customers may be served by a single VPC as specified by the third party. In these embodiments, a new customer may still result in an authorization process and access to new data, but the new data may be provided to an existing VPC which may then include access to data from multiple customers.

Once the appropriate parameters are considered and components generated, the system populates a VPC instance with the appropriate resources, interfaces, and virtual machines and provides it to the customer, or to the third party for data management on the customer's behalf. In some implementations, the constraints of the VPC prohibit the service provider that designed the VPC from using it to access prohibited data, from monopolizing central system resources, from arbitrarily exporting data outside the established constraints of the system, or from corrupting any repository data either inadvertently or deliberately. Furthermore, VPCs running on behalf of multiple customers can potentially access telemetry data from these multiple competing customers without any risk of those customers having data shared within their own systems. Each generated VPC is intentionally isolated from all other VPCs and from any alterations to the underlying data.

At this point it should be noted that techniques for VPC generation in accordance with the present disclosure as described above may involve the processing of input data and the generation of output data to some extent. This input data processing and output data generation may be implemented in hardware or software. For example, specific electronic components may be employed in cloud computing systems, virtual private containers, or similar or related circuitry for implementing the functions associated with VPC generation in accordance with the present disclosure as described above. Alternatively, one or more processors operating in accordance with instructions may implement the functions associated with VPC generation in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-generated method, comprising:
   receiving, via an application server, a specification for a virtual container from a service provider, the specification including analytic components, data ingress parameters, and configuration information, the application server being separate from the virtual container, the configuration information comprising a software-defined network layout and a storage requirement;
   generating, based on the received specification, a virtual container comprising the analytic components, the virtual container configured to access data according to the data ingress parameters, the virtual container further configured according to the specified configuration information;
   authenticating a first customer for services associated with the service provider; and
   in response to authenticating the first customer, authorizing the virtual container to receive secure data from a first data repository associated with the first customer, the virtual container configured to limit access to and from unauthorized systems such that the secure data can be received into the virtual container for analysis therein but cannot be transmitted out of the virtual container.

2. The method of claim 1, wherein the data ingress parameters specify batch data transmission.

3. The method of claim 1, wherein the data ingress parameters specify streaming data transmission.

4. The method of claim 1, further comprising:
   authenticating a second customer for services associated with the service provider; and
   in response to authenticating the second customer, authorizing a second virtual container to receive second secure data from a second data repository associated with the second customer, the second virtual container configured such that the second secure data can be received into the virtual second container for analysis therein but cannot be moved between the second virtual container and the virtual container.

5. The method of claim 1, wherein the analytic components are virtual machines.

6. The method of claim 1, wherein the configuration information includes network configuration between the analytic components.

7. The method of claim 1, wherein the specification further specifies resources and the generated virtual container includes the specified resources.

8. The method of claim 7, wherein the specification includes a repository internal to the virtual container for storing data.

9. An article of manufacture comprising:
at least one non-transitory processor readable storage medium; and
instructions stored on the at least one non-transitory processor readable storage medium, the instructions configured to be readable from the at least one non-transitory processor readable storage medium by at least one processor and thereby cause the at least one processor to operate so as to:
receive, via an application server, a specification for a virtual container from a service provider, the specification including analytic components, data ingress parameters, and configuration information, the application server being separate from the virtual container, the configuration information comprising a software-defined network layout and a storage requirement;
generate, based on the received specification, a virtual container comprising the analytic components, the virtual container configured to access data according to the data ingress parameters, the virtual container further configured according to the specified configuration information;
authenticate a first customer for services associated with the service provider; and
in response to authenticating the first customer, authorize the virtual container to receive secure data from a first data repository associated with the first customer, the virtual container configured to limit access to and from unauthorized systems such that the secure data can be received into the virtual container for analysis therein but cannot be transmitted out of the virtual container.

10. The article of manufacture of claim 9, wherein the data ingress parameters specify batch data transmission.

11. The article of manufacture of claim 9, wherein the data ingress parameters specify streaming data transmission.

12. The article of manufacture of claim 9, wherein the instructions are further configured to cause the at least one processor to operate so as to:
authenticate a second customer for services associated with the service provider; and
in response to authenticating the second customer, authorizing a second virtual container to receive second secure data from a second data repository associated with the second customer, the second virtual container configured such that the second secure data can be received into the virtual second container for analysis therein but cannot be moved between the second virtual container and the virtual container.

13. The article of manufacture of claim 9, wherein the analytic components are virtual machines.

14. The article of manufacture of claim 9, wherein the configuration information includes network configuration between the analytic components.

15. The article of manufacture of claim 9, wherein the specification further specifies resources and the generated virtual container includes the specified resources.

16. The article of manufacture of claim 9, wherein the specification includes a repository internal to the virtual container for storing data.

17. The article of manufacture of claim 9, wherein the virtual container is configured to receive secure data from the first data repository but is not configured to transmit data to the first data repository for storage in the first data repository.

18. The method of claim 1, wherein the virtual container is configured to receive secure data from the first data repository but is not configured to transmit data to the first data repository for storage in the first data repository.

* * * * *